United States Patent [19]

Usuki et al.

[11] Patent Number: 5,430,113
[45] Date of Patent: Jul. 4, 1995

[54] PROCESS TO PREVENT POLYMER SCALE ADHESION USING AN AROMATIC COMPOUND AND A SALT OF POLYVINYLSULFURIC ACID

[75] Inventors: Masahiro Usuki, Ibaraki; Hajime Kitamura, Chiba; Susumu Ueno, Ibaraki; Mikio Watanabe, Ibaraki; Masayoshi Yono, Ibaraki, all of Japan

[73] Assignee: Shin-Etsu Chemical Co., Ltd., Tokyo, Japan

[21] Appl. No.: 261,300

[22] Filed: Jun. 16, 1994

Related U.S. Application Data

[62] Division of Ser. No. 729,681, Jul. 15, 1991, abandoned.

[30] Foreign Application Priority Data

Jul. 16, 1990 [JP]  Japan .................................. 2-187529
Sep. 11, 1990 [JP]  Japan .................................. 2-240245

[51] Int. Cl.⁶ ............................................. C08F 2/00
[52] U.S. Cl. ......................................... 526/62; 526/74
[58] Field of Search ................................ 526/62, 74

[56] References Cited

U.S. PATENT DOCUMENTS

| 4,758,639 | 7/1988 | Koyanagi et al. | 526/62 |
| 4,933,399 | 6/1990 | Shimizu et al. | 526/62 |
| 5,030,762 | 7/1991 | Brake | 564/508 |
| 5,147,948 | 9/1992 | Masuko et al. | 526/62 |

FOREIGN PATENT DOCUMENTS 96319  12/1983  European Pat. Off.
1222595  2/1971  United Kingdom

*Primary Examiner*—Joseph L. Schofer
*Assistant Examiner*—Tom Weber
*Attorney, Agent, or Firm*—Oblon, Spivak, McClelland, Maier, & Neustadt

[57] ABSTRACT

A process to prevent scale adhesion on reactor surfaces when polymerizing vinyl monomers. Coating of internal reactor surfaces with a combination of an amino containing aromatic compound, and an alkali metal or ammonium salt of polyvinylsulfuric acid results in the scale prevention. This combination is applied to reactor surfaces via its mixture with a solvent and is subsequently dried to form the coating.

17 Claims, No Drawings

PROCESS TO PREVENT POLYMER SCALE ADHESION USING AN AROMATIC COMPOUND AND A SALT OF POLYVINYLSULFURIC ACID

This application is a division of application Ser. No. 07/729,681, filed on Jul. 15, 1992, now abandoned.

BACKGROUND OF THE INVENTION

1. Field of the Invention

The present invention relates to a polymer scale preventive agent and a method of preventing polymer scale deposition using the same for polymerization of a monomer having an ethylenic double bond comprising a vinyl halide or vinylidene halide.

2. Description of Prior Art

In processes of preparing polymers by polymerizing a monomer in a polymerization vessel, the problem that polymers deposit on the inner wall surface and other parts which come into contact with the monomer such as stirring blades of the polymerization vessel in the form of scale, is known. The deposition of the polymer scale on the inner wall results in disadvantages that the yield of the polymer and the cooling capacity of the polymerization vessel are lowered; that the polymer scale may peel and mix into manufactured polymer, thereby impairing the quality of the manufactured polymer; and that removal of such polymer scale is laborious and hence time-consuming. Further, since the polymer scale contains unreacted monomer, there is a danger that the operators may be exposed to the unreacted monomer, which may cause some physical disorders.

Heretofore, there are known methods for preventing polymer scale deposition in which the inner wall and so forth are coated with a suitable substance as a polymer scale preventive agent. Such substances suited as polymer preventive agents include, for example, particular polar compounds (Japanese Patent Publication (KOKOKU) No. 45-30343 (1970)); dyes or pigments (Japanese Patent Publication (KOKOKU) Nos. 45-30835(1970) and 52-24953(1977); aromatic amine compound (Japanese Pre-examination Patent Publication (KOKAI) No. 51-50887(1976)); a reaction product of a phenolic compound with an aromatic aldehyde (Japanese Pre-examination Patent Publication (KOKAI) No. 55-54317(1980)).

The above methods using the known polymer scale preventive agents cannot necessarily accomplish prevention of polymer scale deposition at a satisfactory level in polymerization or copolymerization of a monomer comprising a haloethylene such as vinyl chloride or vinylidene chloride. That is, in the polymerization of a haloethylene or a monomer mixture containing it, scale preventive effects vary depending on the conditions such as kinds of a polymerization initiator, chain transfer agent, suspending agent or other additives, the type of polymerization, and materials constituting inner walls of a polymerization vessel. Accordingly, it is required to develop a scale preventive agent which can prevent polymer scale deposition, independent of polymerization conditions.

SUMMARY OF THE INVENTION

It is an object of the present invention to provide a scale preventive agent and a method which are capable of effectively preventing polymer scale deposition on the inner wall, etc. of a polymerization vessel in the polymerization or copolymerization of a monomer having an ethylenic double bond comprising a haloethylene such as vinyl chloride.

According to the present invention, as a means of achieving the above object, there is provided a polymer scale preventive agent for use in polymerization of a monomer having an ethylenic double bond comprising a haloethylene having the general formula (I):

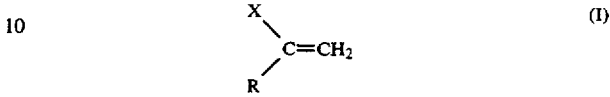

wherein X is a halogen atom such as fluorine and chlorine, and R is a hydrogen atom or a halogen atom such as fluorine and chlorine, said agent comprising:

(A) an aromatic compound having at least one group selected from the class consisting of primary, secondary and tertiary amino groups and the quaternary ammonium group and/or a dye having at least one group selected from said class, and (B) at least one compound selected from the group consisting of alkali metal salts and ammonium salts of a polyvinylsulfuric acid.

According to the present invention, there is also provided a method of preventing polymer scale deposition in a polymerization vessel in polymerization of a monomer having an ethylenic double bond comprising a haloethylene having the general formula (I), wherein said polymerization is carried out in a polymerization vessel having a coating, on its inner wall surfaces, comprising:

(A) an aromatic compound having at least one group selected from the class consisting of primary, secondary and tertiary amino groups and the quaternary ammonium group and/or a dye having at least one group selected from said class, and (B) at least one compound selected from the group consisting of alkali metal salts and ammonium salts of a polyvinylsulfuric acid.

According to the present invention, polymer scale deposition can be effectively prevented in the polymerization of a vinyl halide or a monomer mixture containing it without being influenced by the composition of a polymerization mass or additives such as polymerization initiator, etc. The scale preventing effects are effective in all types of polymerization including suspension, emulsion, solution, bulk and gas phase polymerizations, and effective in polymerization using a polymerization vessel whose inner walls have been glass lined as well as polymerizations using a polymerization vessel made of steels including stainless steel.

DETAILED DESCRIPTION OF PREFERRED EMBODIMENTS

(A) Aromatic Compound and/or Dye

Component (A) of the polymer scale preventive agent is an aromatic compound having at least one group selected from the class consisting of primary, secondary and tertiary amino groups and the quaternary ammonium group and/or a dye having at least one group selected from said class.

The aromatic compound having said group includes, for example, aromatic amines such as diaminodiphenylamine, ethylenedianiline, diaminonaphthalene and like, acridines such as acridine, diaminoacridine and the like, phenazines such as phenazine, aminophenazines and the like, azobenzenes such as aminoazobenzenes, hydroxyazobenzenes and the like, hydrochlorides and sulfates thereof, and alkaloids such as berberine hydrochloride.

The dye having said group includes, for example, C.I. Solvent Yellow 2, 4, 5, 6, 14, 15, 16, 19, 21, 33, 56, 61 and 80; C.I. Solvent Orange 1, 2, 14, 37, 40, 44 and 45; C.I. Solvent Red 1, 3, 8, 23, 24, 25, 27, 30, 49, 81, 82, 83, 84, 100 and 121; C.I. Solvent Brown 3, 5, 20 and 37; C.I. Solvent Black 3, 5, 7, 22 and 23; C.I. Acid Black 123; C.I. Disperse Yellow 1, 3, 4, 5, 7, 31, 33, 49, 50, 60, 61, 64, 66, 71, 72, 76, 78 and 79; C.I. Disperse Orange 1, 3, 5, 11, 13, 20, 21, 30, 32, 41, 43, 45, 46, 49, 50 and 51; C.I. Disperse Red 1, 4, 5, 7, 11, 12, 13, 15, 17, 43, 52, 53, 54, 55, 56, 58, 59, 60, 65, 72, 73, 74, 75, 76, 80, 82, 84, 88, 90, 91, 92, 97, 99, 101, 103, 113, 116, 117, 122, 125, 126, 127, 128 and 129; C.I. Disperse Violet 1, 4, 8, 10, 18, 23, 24, 26, 28, 30, 33, 37 and 38; C.I. Disperse Blue 1, 5, 6, 43, 44, 88 and 96; C.I. Disperse Brown 3 and 5; C.I. Disperse Black 1, 2, 10, 26, 27, 28, 29, 30 and 31; C.I. Basic Red 2 and 12; C.I. Basic Blue 1, 6, 7, 9, 12, 16, 24 and 25; C.I. Basic Black 2; C.I. Basic Orange 2, 14 and 15; C.I. Basic Violet 10 and 14; C.I. Basic Yellow 1, 4 and 6; C.I. Basic Green 5 and 12; C.I. Basic Brown 1; and condensation products of an aromatic amine compound with an aromatic nitro compound, e.g., condensation products obtained by condensation of an aromatic amine compound and an aromatic nitro compound in the presence of a mineral acid and a specified condensation catalyst at a temperature of from 100° C. to 250° C., disclosed in U.S. Pat. No. 4,528,336 which is incorporated herein by reference.(¹)

The aromatic compounds and dyes can be used singly or in combination of two or more.

Among them, out of the aromatic compounds, preferred are diaminodiphenylamine, diaminonaphthalenes, diaminoacridines, aminoazobenzenes and berberine hydrochloride, and out of the dyes, preferred are C.I.Solvent Black 3, 5, 7 and 22, C.I.Basic Black 2, C.I.Basic Orange 14, and the condensation products obtained by condensation of an aromatic amine compound having the general formula:

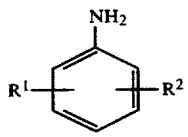

wherein $R^1$ is a hydrogen atom, chlorine atom, amino group, phenylamino group or hydroxyphenylamino group and $R^2$ is a hydrogen atom, amino group, hydroxy group or methyl group, with an aromatic nitro compound having the general formula:

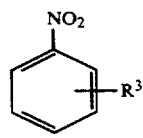

wherein $R^3$ is a hydrogen atom, chlorine atom, hydroxy group, methoxy group, ethoxy group, amino group or carboxyl group, in the presence of a condensation catalyst at a temperature of 100° C. to 250° C. disclosed in the U.S. Pat. No. 4,528,336, specifically Condensation Products I to XXI described Table 4 later.(²) Particularly preferred are C.I.Solvent Black 3, 5, 7 and 22 and said Condensation Products I, IV, XI, XII, XIV and XVII.

(B) Salt of Polyvinylsulfuric Acid

The salt of polyvinylsulfuric acid used as component (B) of the polymer scale preventive agent preferably has a polymerization degree of 500 or more, more preferably from 1,000 to 5,000 because the polymer scale preventing effects are enhanced.

The alkali metal salt or ammonium salt of polyvinylsulfuric acid is, for example, represented by the following structural formula:

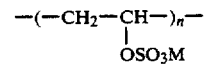

wherein M is an alkali metal such as K, Na or the like or an ammonium ion and n is an integer, and the sulfonation degree is preferably from 90 to 95%.

(C) Naphthoquinone Natural Dye

In a preferred embodiment of the present invention, the polymer scale preventive agent or the coating formed on the inner wall surface of the polymerization vessel further comprises (C) a naphthoquinone natural dye. The naphthoquinone natural dye improves the polymer scale preventing effects and the durability of the effects as well.

The naphthoquinone natural dye includes, for example, naphthoquinones such as lawsone, juglone and plumbagin, naphthazarins such as naphthazarin, 2,3-dihydroxynaphthazarin, 2-methylnaphthazarin, naphthopurpurin, 2-hydroxy-3-methylnaphthazarin, 2-hydroxy-3-ethylnaphthazarin, 2-hydroxy-3-acetylnaphthazarin, 2,7-dimethylnaphthazarin, alkannan, echinochrome A, and spinochrome A; shikonins such as alkannin, shikonin, acetylshikonins, isobutylshikonins, $\beta,\beta'$-dimetylacrylshikonins, $\beta$-hydroxyisovalerylshikonins, and tetracrylshikonins; and derivatives thereof. These can be used singly or in combination of two or more.

Among these, preferred are naphtopurpurin, alkannan, 2,3-dihydroxynaphthazarin, shikonin, and all of the shikonin derivatives. Particularly preferred are shikonin and its derivatives. Extract from lithospermum root contains shikonins and hence may be used. Some shikonins are recently mass-produced using bio technology and commercially available.

The polymer scale preventive agent is used for preventing deposition of polymer scale by forming a coating on the inner wall surfaces, etc. of a polymerization vessel.

The polymer scale preventive agent may contain, in addition to components (A), (B) and optionally (C), a solvent, a surface active agent, a water-soluble polymer compound, an organic or inorganic pH adjuster, etc. For forming said coating on the inner wall surfaces, etc. of a polymerization vessel, normally the polymer scale preventive agent is used in the form of a liquid (solution or dispersion), i.e., as a coating liquid.

In the polymer scale preventive agent, component (B) is contained in an amount of normally 1 to 100,000 parts by weight, preferably 10 to 10,000 parts by weight per 100 parts by weight of component (A). Component (C) is contained in an amount of normally 0.1 to 5,000 parts by weight, preferably 1 to 500 parts by weight per 100 parts by weight of component (A). If the amount of component (B) or component (C) relative to that of component (A) is outside the range above, improvement in prevention of polymer scale due to the combined use of component (B) or (C) is hardly obtained. If the amount of component (B) is unsuitable, the coating liquid may be unstable and sediment of component (A) may be formed, so that uniform coatings can be formed with difficulty.

Preparation of Coating Liquid

The coating liquid mentioned above is prepared by adding component (A), component (B) and optionally component (C) to a suitable solvent.

The solvent used for preparation of the coating liquid include, for example, water; alcohols such as methanol, ethanol, propanol, 1-butanol, 2-butanol, 2-methyl-1-propanol, 2-methyl-2-propanol, 3-methyl-1-butanol, 2-methyl-2-butanol, and 2-pentanol; ketones such as acetone, methyl ethyl ketone, and methyl isobutyl ketone; ethers such as 4-methyl dioxolan, and ethylene glycol diethyl ether; esters such as methyl formate, ethyl formate, methyl acetate, and methyl acetoacetate; furans such as tetrahydrofuran, furfural, fulfuryl alcohol and tetrahydrofurfuryl alcohol; aliphatic hydrocarbons such as n-hexane and n-heptane; aromatic hydrocarbons such as benzene, toluene, and xylene; halogenated hydrocarbons such as chloromethylene, 1-chlorobutane, amyl chloride, dichloroethylene, and 1,1,2-trichloroethane, and aprotic organic solvents such as acetonitrile, formamide, dimethylformamide, dimethyl sulfoxide and N-methylpyrrolidone. These solvents are used singly or as a mixed solvent of two or more.

Among there solvents, particularly preferred are water and alcohols such as methanol and ethanol, and mixed solvents thereof.

The total concentration of component (A), component (B) and optionally component (C) is not limited as long as the coating weight after dried described later is attained, but normally from 0.0001 to 5 % by weight, preferably from 0.001 to 2% by weight. The concentration of component (C) is normally from 0.0001 to 5% by weight, preferably from 0.001 to 0.5% by weight. If the amount of component (C) is too large, component (C) may form sediment, resulting in that uniform coating can be formed with difficulty; on the other hand, if too small, component (C) cannot bring about its effect due to its use.

The coating liquid preferably contains (D) a water-soluble polymer compound, and more preferably further contains (E) a pH adjuster together with the component (D) in such an amount that the pH of the coating liquid may be adjusted to 7 or below, preferably to 6 or below, because the polymer scale preventing effects are further improved.

(D) Water-Soluble Polymer Compound

The water-soluble polymeric compound (D) includes, for example, hydroxyl group-containing polymeric compounds, amphoteric polymeric compounds, anionic polymeric compounds, and cationic polymeric compounds. Among them, preferred are hydroxyl group-containing polymeric compounds and cationic polymeric compounds.

The hydroxyl group-containing polymeric compound includes, for example, starches and derivatives thereof such as amylose, amylopectin, dextrin, oxidized starch, acetyl starch, nitrostarch, methyl starch, and carboxymethyl starch; hydroxyl group-containing plant mucous polysaccharides such as pectic acid, protopectin, pectinic acid, laminarin, fucoidin, agar, and carrageenan; hydroxyl group-containing animal mucous polysaccharides such as hyaluronic acid, chondroitin sulfuric acid, heparin, keratosulfuric acid, chitin, charonin sulfuric acid, and limacoitin sulfuric acid; nucleic acids such as ribonucleic acid and deoxyribonucleic acid; cellulose derivatives such as methyl cellulose, ethyl cellulose, carboxymethyl cellulose, glycol cellulose, benzyl cellulose, cyanoethyl cellulose, cellulose methylene ether, triphenylmethyl cellulose, formyl cellulose, cellulose acetate, cellulose propionate, cellulose butyrate, cellulose acetate propionate, cellulose sulfonate ester, cellulose carbamate ester, nitrocellulose, cellulose phosphate, and cellulose xanthogenate; hemicelluloses such as xylan, mannan, arabogalactan, galactan, and araban; lignins such as alcohol lignin, dioxane lignin, phenol lignin, hydrotropic lignin, mercaptolignine, thioglycollic acid lignin, lignin sulfonic acid, alkali lignin, thioalkali lignin, acid lignin, cuproxam lignin, and periodate lignin; phenol-formaldehyde resins, partially saponified polyvinyl alcohols, and polyvinyl alcohols.

The amphoteric polymeric compounds include, for example, glue, gelatin, casein, and albumin.

The anionic polymeric compound includes, for example, anionic polymeric compounds having a carboxyl group or sulfonic acid group in the side chain as exemplified by sulfomethylated compounds of polyacrylamide, polyacrylic acid, alginic acid, an acrylamide/vinylsulfonic acid copolymer, polymethacrylic acid, polystyrenesulfonic acid and polyvinylsulfonic acid and alkali metal salts or ammonium salts of these, and carboxymethyl cellulose.

The cationic polymeric compound includes cationic polymeric electrolytes having a nitrogen atom with positive electric charge in the side chain, including, for example, polyvinylamines, polyethyleneamines, polyethyleneimines, polyacrylamides, N-vinyl-2-pyrrolidone/acrylamide copolymer, polyvinylpyridines, polyvinylpyrrolidones, polyvinylcarbazoles, polyvinylimidazolines, polydimethylaminoethyl acrylates and polydimethylaminoethyl methacrylates.

These water-soluble polymeric compounds may be used singly or in combination of two or more.

Among these water-soluble polymer compounds (D), preferred are carboxymethyl cellulose, methyl cellulose, polyethyleneimine, polyvinylpyrrolidone, polyvinyl alcohols, and gelatin. Particularly preferred are polyvinyl alcohols. Where a polyvinyl alcohol is used as component (D), the scale preventing effects obtained varies depending on its polymerization degree; polyvinyl alcohols with a polymerization degree of 1,000 or above brings about good scale preventing effects.

The concentration of component (D) in a coating liquid is preferably in the range of from 0.0001 to 5% by weight, more preferably from 0,001 to 0.5% by weight.

(E) pH Adjuster

The pH adjuster (E) includes, for example, sulfuric acid, hydrochloric acid, phosphoric acid, nitric acid, carbonic acid, perchloric acid, molybdic acid, tungstic acid, phosphomolybdic acid, phosphotungstic acid, molybdosilicic acid, tungstosilicic acid, formic acid, acetic acid, oxalic acid, lactic acid, maleic acid, glycollic acid, thioglycollic acid, p-toluenesulfonic acid, tannic acid, phytic acid and the acidic salts thereof. These may be used singly or in combination of two or more. Among these, particularly preferred are phosphoric acid, hydrochloric acid, perchloric acid, molybdic acid, tungstic acid, phosphomolybdic acid, phosphotungstic acid, molybdosilicic acid, tungstosilicic acid, p-toluenesulfonic acid, phytic acid and the acidic salts thereof. These pH adjusters are preferably used as an aqueous solution with a suitable concentration when the pH of a coating liquid is adjusted.

Formation of the Coating

The polymer scale preventive liquid is applied to the inner walls of a polymerization vessel and then dried sufficiently, followed by washing with water if necessary, to form the coating. The drying may be carried out at a temperature from room temperature to 100° C., for instance.

The polymer scale preventive liquid is preferably applied to not only the inner wall surface of a polymerization vessel but also other parts with which the monomer comes into contact during polymerization to form a coating on such parts. For example, it is preferred to apply the coating solution to a stirring shaft, stirring blades, condensers, headers, search coil, bolts, nuts, etc. to form the coating thereon. Particularly, on stirring blades, stirring shaft and baffles, the coating should be formed by application of the coating solution.

More preferably, for formation of the coating, the polymer scale preventive liquid is applied to portions with which monomers does not come into contact during polymerization but on which polymer scale may deposit, for example, portions of recovery system for unreacted monomer with which unreacted monomer comes into contact, such as inner surfaces, etc. of equipment and pipes of the recovery system. Specifically, such portions include the inner surfaces of monomer distillation columns, condensers, monomer stock tanks and valves.

The method of applying the coating solution is not particularly limited, and includes, for example, the brush coating, spray coating, the method of filing the polymerization vessel with the coating solution followed by withdrawal thereof, and automatic coating methods as disclosed in Japanese Pre-examination Patent Publication (KOKAI) Nos. 57-61001(1982) and 55-36288(1980), and Japanese Patent Publication (KOHYO) Nos. 56-501116(1981) and 56-501117(1981), and Japanese Pre-examination Publication (KOKAI) No. 59-11303(1984), etc.

The method of drying wet coated surfaces provided by application of the polymer scale preventive liquid, is not limited, either. Following methods can be used. That is, a method in which, after the solution is applied, hot air with an suitable elevated temperature is blown to the coated surface, and a method in which the inner wall surface of a polymerization vessel and the surfaces of other parts to be coated are previously heated to from 30° to 80° C., and the polymer scale preventive liquid is directly applied to the heated inner wall surfaces, etc. After dried, the coated surfaces are washed with water if necessary.

The coating thus obtained normally has a coating weight of preferably 0.001 to 5 g/m² or more, and more preferably from 0.01 to 2 g/m².

Polymerization

After the formation of the coating on the inner wall surfaces of a polymerization vessel, and preferably other parts with which monomer may come into contact during polymerization by coating treatment, polymerization is carried out in accordance with conventional procedures. That is, a monomer comprising a haloethylene, a polymerization initiator, and optionally a polymerization medium such as water, etc., a suspending agent, a solid dispersing agent, a dispersing agent such as nonionic or anionic surfactants are charged into the polymerization vessel, followed by carrying out polymerization according to conventional methods.

The monomer to be polymerized according to the present method may be a haloethylene of the general formula (I) alone or a monomer mixture containing the haloethylene and other monomers having an ethylenic double bond copolymerizable therewith (normally the amount of haloethylene is 50% by weight or more). The haloethylenes include, for example, vinyl halides such as vinyl chloride, vinyl fluoride and the like, and vinylidene halides such as vinylidene chloride, vinylidene fluoride and the like, which may be used singly or in combination of two or more. The other monomers having an ethylenic double bond to be used as a co-monomer include, for example, vinyl esters such as vinyl acetate and vinyl propionate; acrylic acid, methacrylic acid, and esters or salts thereof; diene monomers such as butadiene, chloroprene and isoprene; aromatic vinyl compounds such as styrene and α-methylstyrene; and vinyl ethers. These co-monomers can be used singly or in combination of two or more.

There are no particular limitations on the type of polymerization to which the method of this invention can be applied. The present invention is effective in any type of polymerization such as suspension polymerization, emulsion polymerization, solution polymerization, bulk polymerization, and gas phase polymerization. Particularly, the present method is more suitable to polymerizations in an aqueous medium such as suspension or emulsion polymerization.

In the following, general conditions are described on each type of polymerization.

In the case of suspension or emulsion polymerization, first, water and a dispersing agent are charged into a polymerization vessel, and thereafter a polymerization initiator is charged. Subsequently, the inside of the polymerization vessel is evacuated to a pressure of from 0.1 to 760 mmHg, and a monomer is then charged (whereupon the pressure inside the polymerization vessel usually becomes from 0.5 to 30 kgf/cm².G). Thereafter, polymerization is carried out at a temperature of from 30° to 150° C. During the polymerization, one or more of water, a dispersing agent and a polymerization initiator may be added, if necessary. Reaction temperature during the polymerization is different depending on the kind of monomer to be polymerized. For example, in the case of polymerizing vinyl chloride, polymerization is carried out at 30° to 80° C. The polymerization may be judged to be completed when the pressure inside the polymerization vessel falls to from 0 to 7 kgf/cm².G or when cooling water which passes through a jacket provided around the polymerization vessel indicates almost the same temperature at the inlet where it is charged and at the outlet where it is discharged (i.e., when liberation of heat due to polymerization reaction has subsided). The water, dispersing agent and polymerization initiator to be charged for polymerization are used in amounts of 20 to 500 parts by weight, 0.01 to 30 parts by weight, and 0.01 to 5 parts by weight, respectively, per 100 parts by weight of the monomer.

In the case of solution polymerization, an organic solvent such as toluene, xylene and pyridine is used as the polymerization medium in place of water. The dispersing agent is optionally used. The other conditions are generally the same as those described for suspension and emulsion polymerizations.

In the case of bulk polymerization, after the inside of a polymerization vessel is evacuated to a pressure of from about 0.01 mmHg to about 760 mmHg, a monomer and a polymerization initiator are charged into the polymerization vessel, and then polymerization is carried out at a temperature of from −10° C. to 250° C. Specific methods of the bulk polymerization includes, for example, liquid bulk polymerization and gas phase polymerization for vinyl chloride.

Application of the method of preventing polymer scale deposition of the present invention to polymerization, makes it possible to prevent polymer scale from depositing, independent of materials constituting the inner wall, etc. of a polymerization vessel. For example, this method can prevent deposition of polymer scale even in the case polymerization is carried out in a polymerization vessel made of a steel including stainless steel or a vessel whose inner walls are lined with glass.

Any additive materials that have been conventionally added in a polymerization system can be used without any limitation. More specifically, the method of this invention can effectively prevent polymers from depositing, even in polymerization systems containing the following additives: for example, polymerization catalysts such as t-butyl peroxyneodecanoate, bis(2-ethylhexyl) peroxydicarbonate, 3,5,5-trimethylhexanoyl peroxide, α-cumyl peroxyneodecanoate, cumene hydroperoxide, cyclohexanone peroxide, t-butyl peroxypivalate, bis(2-ethylhexyl) peroxydicarbonate, benzoyl peroxide, lauroyl peroxide, 2,4-dichlorobenzoyl peroxide, diisopropyl peroxydicarbonate, α,α′-azobisisobutyronitrile, α,α′-azobis-2,4-dimethylvaleronitrile, potassium peroxodisulfate, ammonium peroxodisulfate, p-menthane hydroperoxide; suspension agents comprised of natural or synthetic polymeric compounds such as partially saponified polyvinyl alcohols, polyacrylic acids, vinyl acetate/maleic anhydride copolymer, cellulose derivatives such as hydroxypropylmethyl cellulose, and gelatin; solid dispersing agents such as calcium phosphate and hydroxyapatite; nonionic emulsifying agents such as sorbitan monolaurate, sorbitan trioleate and polyoxyethylene alkyl ether; anionic emulsifying agents such as sodium lauryl sulfate, sodium alkylbenzenesulfonates such as sodium dodecylbenzenesulfonate and sodium dioctylsulfosuccinate; fillers such as calcium carbonate and titanium oxide; stabilizers such as tribasic lead sulfate, calcium stearate, dibutyltin dilaurate and dioctyltin mercaptide; lubricants such as rice wax, stearic acid and cetyl alcohol; plasticizers such as DOP and DBP; chain transfer agents such as mercaptans such as t-dodecyl mercaptan, and trichloroethylene; and pH adjusters.

In the practice of the present method, the coating operation of the coating liquid may be conducted every batch or every some tens of batches. The coating formed has a high durability and maintains the polymer scale preventing action. Therefore, normally, coating treatment may be conducted every several batches or some tens of batches, so that the polymerization vessel can be used repeatedly without deposition of polymer scale on the inner wall, etc. of the vessel.

EXAMPLES

The present invention is now described in detail by way of working examples and comparative examples. In each of the tables below, Experiment Nos. marked with * indicate comparative examples, and the other Experiment Nos., working examples of the present invention.

EXAMPLE 1

Preparation of Coating Liquids

Component (A) (the aromatic compound and/or dye) was dissolved or dispersed in a solvent. To the resulting mixture, an aqueous solution of potassium polyvinylsulfate with a polymerization degree of 1,500 was added, and optionally a methanol solution of a component (C) indicated in Table 1 was added, and mixed to prepare Coating liquid Nos. 1–45, provided that, in place of the potassium polyvinylsulfate, a sodium polyvinylsulfate with a polymerization degree of 1,500 was used for coating liquid No. 44, and an ammonium polyvinylsulfate with a polymerization degree of 1,500 was used for coating liquid No. 45. The concentration of component (A) in the Coating liquids was adjusted to 0.1% by weight.

In Table 1, in regard to each of the coating liquids, the kind of component (A), the weight ratio of the component (A)/(B), the kind of component (C), the concentration of component (C) and the solvent used are given. However, the coating liquids of Nos. 20 and 21 are comparative examples in which none of components (B) and (C) is contained.

TABLE 1-A

| No. of coating liquid | (A) Aromatic compound or dye | Wt. ratio (A)/(B) | Solvent Composition | Wt. ratio |
|---|---|---|---|---|
| 1 | p,p′-diaminodiphenylamine | 60/100 | Water/Methanol | 50/50 |
| 2 | Berberine hydrochloride | 60/100 | " | 60/40 |
| 3 | 1,8-diaminonaphthalene | 60/100 | " | 60/40 |
| 4 | 3,6-diaminoacridine | 60/100 | Water/Ethanol | 70/30 |
| 5 | p-aminoazobenzene | 60/100 | " | 40/60 |
| 6 | Condensation product I[(1)] | 40/100 | Water/Methanol | 50/50 |
| 7 | Condensation product IV[(1)] | 40/100 | " | 50/50 |
| 8 | Condensation product XI[(1)] | 40/100 | " | 50/50 |
| 9 | Condensation product XII[(1)] | 40/100 | " | 50/50 |
| 10 | Condensation product XIV[(1)] | 40/100 | " | 50/50 |
| 11 | Condensation product XVII[(1)] | 40/100 | " | 50/50 |
| 12 | C.I. Solvent Black 3 | 50/100 | Water/Ethanol | 50/50 |
| 13 | C.I. Solvent Black 5 | 50/100 | " | 50/50 |
| 14 | C.I. Solvent Black 7 | 50/100 | " | 40/60 |
| 15 | C.I. Solvent Black 22 | 50/100 | Water/Methanol | 60/40 |
| 16 | C.I. Basic Orange 2 | 50/100 | Water/Methanol | 60/40 |
| 17 | C.I. Basic Black 2 | 50/100 | " | 60/40 |
| 18 | C.I. Disperse Yellow 7 | 50/100 | " | 50/50 |
| 19 | C.I. Disperse Orange 3 | 50/100 | " | 60/40 |
| 20 | C.I. Basic Brown 1 | 50/100 | " | 50/50 |
| 21 | Condensation product I[(1)] | 100/0 | Methanol | — |

TABLE 1-A-continued

| No. of coating liquid | (A) Aromatic compound or dye | Wt. ratio (A)/(B) | Solvent Composition | Wt. ratio |
|---|---|---|---|---|
| 22 | Condensation product XVII[1] | 100/0 | " | — |

Remarks
(1) The condensates are disclosed in U.S. Pat. No. 4,528,336 and described in Table 4 later.

TABLE 1-B

| No. of coating liquid | (A) Aromatic compound or dye | Wt. ratio (A)/(B) | (C) Naphthoquinone natural dye | (C) Weight (%) | Solvent Composition | Wt. ratio |
|---|---|---|---|---|---|---|
| 23 | p,p'-diaminodiphenylamine | 60/100 | Naphthazarin | 0.05 | Water/Methanol | 40/60 |
| 24 | Berberine hydrochloride | 60/100 | Alkanrian | 0.05 | " | 40/60 |
| 25 | 1,8-diaminonaphthalene | 60/100 | Shikonin | 0.05 | " | 40/60 |
| 26 | 3,6-diaminoacridine | 60/100 | Lawsone | 0.05 | " | 40/60 |
| 27 | p-aminoazobenzene | 60/100 | Naphthopurpurin | 0.05 | " | 40/60 |
| 28 | Berberine hydrochloride/ 1,8-diaminoaphthalene (30/30) | 60/100 | Naphthazarin | 0.05 | " | 40/60 |
| 29 | 3,6-diaminoacridine/ 1,8-diaminoaphthalene (30/30) | 60/100 | Shikonin | 0.015 | " | 50/50 |
| 30 | Berberine hydrochloride/ 3,6-diaminoacridine (30/30) | 60/100 | " | 0.015 | " | 50/50 |
| 31 | p-aminoazobenzene/ 3,6-diaminoacridine (30/30) | 60/100 | " | 0.015 | " | 50/50 |
| 32 | 1,8-diaminonaphthalene | 60/100 | Lithospermum root extract[2] | 0.02 | " | 70/30 |
| 33 | Berberine hydrochloride/ 1,8-diaminonaphthalene (30/30) | 60/100 | " | 0.02 | " | 70/30 |
| 34 | 3,6-diaminoacridine/ 1,8-diaminonaphthalene (30/30) | 60/100 | " | 0.02 | " | 70/30 |
| 35 | C.I. Solvent Black 3 | 50/100 | " | 0.03 | " | 50/50 |
| 36 | C.I. Solvent Black 5 | 50/100 | Lithospermn root extract[2] | 0.03 | Water/Methanol | 50/50 |
| 27 | C.I. Solvent Black 7 | 50/100 | " | 0.03 | " | 50/50 |
| 38 | C.I. Solvent Black 22 | 50/100 | " | 0.03 | " | 50/50 |
| 39 | C.I. Basic Orange 2 | 50/100 | " | 0.03 | " | 50/50 |
| 40 | C.I. Basic Black 2 | 50/100 | " | 0.03 | " | 50/50 |
| 41 | C.I. Disperse Orange 3 | 50/100 | " | 0.03 | " | 50/50 |
| 42 | Condensation product I[1] | 40/100 | Shikonin | 0.015 | " | 50/50 |
| 43 | Condensation product XVII[1] | 40/100 | " | 0.015 | " | 50/50 |
| 44[3] | " | 40/100 | " | 0.015 | " | 50/50 |
| 45[4] | " | 40/100 | " | 0.015 | " | 50/50 |

Remarks
(1) The condensates are disclosed in U.S. Pat. No. 4,528,336 and described in Table 4 later.
(2) The extract was a solution obtained by immersing 100 g of lithospenmin root in a mixed solvent of 1 liter of ethanol and 2 ml of acetic acid at room temperature for 48 hours. The solution obtained contains 15 g of dyes.
(3) Sodium polyvinylsulfate was used for component (B).
(4) Ammonium polyvinylsulfate was used for component (B).

EXAMPLE 2

In each experiment, polymerization was carried out in the following manner using a stainless steel polymerization vessel with an inner capacity of 20 liters and equipped with a stirrer.

In Experiment No. 102 to 141, a coating liquid indicated in Table 2, which was prepared in Example 1, was applied to the inner wall surfaces, stirring shaft, stirring blades, baffles and other parts with which monomers come into contact during polymerization, and then dried at 50° C. for 15 minutes by heating and washed with water to form a coating. The coating thus formed had a total coating weight of 0.1 g/m$^2$ after dried.

The coatings formed in each experiment are outlined below.

Experiment No. 101: No coating was formed.
Experiment Nos. 102-120, 125 and 133: The coating liquids were used as they were prepared in Example 1.
Experiment Nos. 121-124, 126-132 and 134-141: To the coating liquids as prepared in Example 1, a component (D) (water soluble polymer compound) and optionally a component (E) (pH adjuster) were added, and resulting liquids were used for application.

Among the experiments above, experiments of Nos. 101-103 are comparative examples.

In Table 2, No. of the coating liquid used, the kind and concentration of component (D), the kind of component (E), and the pH of the coating liquid in each experiment are given.

In the polymerization vessel thus coated, were charged 5.2 kg of vinyl chloride, 10 kg of pure water, 5.2 kg of a partially saponified polyvinyl alcohol and 2.6 g of bis(2-ethylhexyl) peroxodicarbonate. Polymerization was then carried out with stirring at 58° C. for 6 hours. After the completion of polymerization, the resulting polymer and unreacted monomers were recovered, and the inside of the polymerization vessel was washed with water.

The operations from forming the coating by application of the coating liquid, through charging the monomer, etc. and polymerization to washing with water were repeated three times. After the three batches of polymerization, the amount of polymer scale deposition was measured. The results are given in Table 2.

TABLE 2-A

| Exp. No. | No. | Coating liquid (C) Water-soluble polymer compound | (C) Concentration (g/l) | (D) pH adjuster | pH | Amount of polymer scale (g/m²) |
|---|---|---|---|---|---|---|
| 101* | — | — | — | — | — | 1500 |
| 102* | 21* | — | — | — | 3 | 180 |
| 103* | 22* | — | — | — | 3 | 120 |
| 104 | 6 | — | — | — | 5 | 10 |
| 105 | 11 | — | — | — | 5 | 15 |
| 106 | 8 | — | — | — | 5 | 26 |
| 107 | 10 | — | — | — | 5 | 32 |
| 108 | 1 | — | — | — | 7 | 40 |
| 109 | 2 | — | — | — | 7 | 15 |
| 110 | 3 | — | — | — | 7 | 19 |
| 111 | 4 | — | — | — | 9 | 16 |
| 112 | 5 | — | — | — | 7 | 29 |
| 113 | 12 | — | — | — | 7 | 32 |
| 114 | 15 | — | — | — | 5 | 30 |
| 115 | 16 | — | — | — | 4 | 39 |
| 116 | 17 | — | — | — | 3 | 25 |
| 117 | 18 | — | — | — | 7 | 34 |
| 118 | 19 | — | — | — | 7 | 26 |
| 119 | 20 | — | — | — | 4 | 30 |

TABLE 2-B

| Exp. No. | No. | (D) Water-soluble[1] polymer compound | (D) Concentration (g/l) | (E) pH adjuster | pH | Amount of polymer scale (g/m²) |
|---|---|---|---|---|---|---|
| 120 | 42 | — | — | — | 3.0 | 18 |
| 121 | 43 | PVA ($s = 99\%$, $p = 3,000$) | 0.15 | — | 3.5 | 16 |
| 122 | 42 | PVA ($s = 99\%$, $p = 2,500$) | 0.2 | Tungstic acid | 2.5 | 2 |
| 123 | 23 | Polyacrylic acid | 0.5 | Polyphosphoric acid | 5.0 | 4 |
| 124 | 24 | Methylcellulose | 0.2 | Acetic acid | 5.0 | 6 |
| 125 | 25 | — | — | — | 6.0 | 19 |
| 126 | 26 | PVA ($s = 85\%$, $p = 2,000$) | 0.4 | — | 3.5 | 12 |
| 127 | 27 | Methylcellulose | 0.2 | Pyrophosphoric acid | 4.0 | 4 |
| 128 | 29 | Polyethylene-imine | 0.3 | Phosphomolybdic acid | 3.0 | 0 |
| 129 | 30 | Polyvinylpyrrolidone | 0.5 | Tungstosilisic acid | 3.0 | 0 |
| 130 | 32 | Carboxymethylcellulose/ Polyvinylpyrrolidone | 0.6 | Phosphomolybdic acid/ Phytic acid | 3.0 | 1 |
| 131 | 33 | PVA ($s = 99\%$, $p = 3,000$)/ Polyethylene-imine | 0.3 | Phytic acid/ Phosphoric acid | 2.0 | 0 |
| 132 | 35 | Gelatin | 0.5 | p-tolunesulfonic acid | 5.0 | 3 |
| 133 | 36 | — | — | — | 5.5 | 9 |
| 134 | 37 | PVA ($s = 99\%$, $p = 2,000$) | 0.5 | — | 6.0 | 7 |
| 135 | 34 | Polyethylene-imine | 0.2 | Phosphoric acid | 4.0 | 3 |
| 136 | 34 | PVA ($s = 99\%$, $p = 2,000$) | 0.2 | Phytic acid | 4.0 | 0 |
| 137 | 34 | PVA ($s = 99\%$, $p = 2,000$) | 0.2 | Tungstosilisic acid | 3.0 | 1 |
| 138 | 34 | PVA ($s = 99\%$, $p = 4,000$) | 0.2 | Phytic acid/ Tungstosilisic acid | 2.0 | 0 |
| 139 | 34 | PVA ($s = 99\%$, $p = 500$) | 0.2 | Phosphoric acid/ Tungstosilisic acid | 2.5 | 0 |
| 140 | 44 | " | 0.2 | Phosphoric acid/ Tungstosilisic acid | 2.5 | 1 |
| 141 | 45 | " | 0.2 | Phosphoric acid/ Tungstosilisic acid | 2.5 | 2 |

Remarks: PVA represents polyvinyl alcohol
(1) s: saponification degree,
p: polymerization degree

EXAMPLE 3

In each experiment, a coating was formed inside a polymerization vessel having an inner capacity of 20 liters and equipped with a stirrer by conducting the operations of applying a coating liquid, drying and washing with water in the same manner as in Example 2. The coating thus formed had a coating weight of 0.1 g/m² after dried.

The coating formed in each experiment are outlined below.

Experiment No. 201: No coating was formed.

Experiment Nos. 202-207: The coating liquids were used as they were prepared in Example 1.

Experiment Nos. 208-225: To the coating liquids as prepared in Example 1, a component (D) (water soluble polymer compound) and/or a component (E) (pH adjuster) were/was added, and resulting liquids were used for application.

Among the experiments above, Experiment Nos. 201-203 are comparative examples.

In Table 3, No. of the coating liquid used, the kind and concentration of component (D), the kind of component (E), and the pH of the coating liquid in each experiment are given.

In the polymerization vessel thus coated, were charged 12 kg of water, 5.1 kg of vinyl chloride, 1.2 kg of vinyl acetate, 3.6 g of a partially saponified polyvinyl alcohol, 1.2 g of hydroxypropylmethylcellulose, 60 g of trichloroethylene and 1.5 g of α,α'-azobis-2,4-diemthyl-valeronitrile. Polymerization was then carried out with stirring at 58° C. for 6 hours. After the completion of polymerization, the resulting polymer and unreacted monomers were recovered, and the inside of the polymerization vessel was washed with water.

The operations from forming the coating by application of the coating liquid, through charging the monomer, etc. and polymerization to washing with water were repeated three times. After the three batches of polymerization, the amount of polymer scale deposition was measured. The results are given in Table 3.

TABLE 3

| Exp. No. | No. | (D) Water-soluble polymer compound | (D) Concentration (g/l) | (E) pH adjuster | pH | Amount of polymer scale (g/m²) |
|---|---|---|---|---|---|---|
| 201* | — | — | — | — | — | 2500 |
| 202* | 21* | — | — | — | — | 200 |
| 203* | 22* | — | — | — | — | 230 |
| 204 | 6 | — | — | — | — | 34 |
| 205 | 11 | — | — | — | — | 43 |
| 206 | 7 | — | — | — | — | 35 |
| 207 | 9 | — | — | — | — | 32 |
| 208 | 10 | Methylcellulose | 0.5 | — | — | 25 |
| 209 | 10 | — | — | Phytic acid | 6 | 22 |
| 210 | 10 | PVA (p = 2,500) | 0.3 | Phosphoric acid | 5 | 8 |
| 211 | 10 | Benzylcellulose | 0.5 | p-tolunesulfonic acid | 6 | 10 |
| 212 | 13 | Amylose | 0.5 | Acetic acid | 6 | 13 |
| 213 | 13 | PVA (p = 4,000) | 0.1 | Phosphoric acid | 6 | 7 |
| 214 | 13 | Carboxymethylcellulose | 1.0 | Maleic acid | 6 | 10 |
| 215 | 3 | Pectic acid | 0.7 | Phytic acid | 5 | 10 |
| 216 | 3 | PVA (p = 4,000) | 0.2 | p-tolunesulfonic acid | 6 | 6 |
| 217 | 3 | PVA (p = 4,000) | 0.1 | Tungstic acid | 6 | 8 |
| 218 | 4 | Gelatic | 1.0 | Sulfuric acid | 4 | 15 |
| 219 | 4 | PVA (p = 4,000) | 0.3 | Phytic acid | 5 | 9 |
| 220 | 16 | Methylcellulose | 0.5 | Lactic acid | 6 | 12 |
| 221 | 17 | Polyacrylic acid | 0.5 | Perchloric acid | 4 | 13 |
| 222 | 18 | Carboxymethylcellulose | 0.8 | Phytic acid | 5 | 10 |
| 223 | 19 | PVA (p = 2,500) | 0.2 | Molybdosilisic acid | 6 | 8 |
| 224 | 20 | PVA (p = 2,500) | 0.2 | Phosphoric acid | 6 | 6 |
| 225 | 20 | Polystyrenesulfonic acid | 1.5 | " | 6 | 8 |

Remarks
PVA represents polyvinyl alcohol
p = polymerization degree

Remarks (1) According to U.S. Pat. No. 4,528,336, the following reactants are used for preparation of the condensation product.

The aromatic amine compound is represented by the general formula:

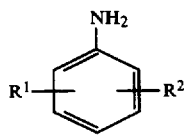

in which $R^1$ is a hydrogen atom, chlorine atom or a group selected from the class consisting of amino, phenylazo —N=N—$C_6H_5$, hydroxy, acetyl, methoxy, phenylamino, aminophenylamino, methoxyphenylamino, dimethylamino, hydroxyphenylamino and acetylamino groups as well as alkyl groups having from 1 to 3 carbon atoms and $R^2$ is a hydrogen atom, amino group, hydroxy group or methyl group.

Exemplary of such an aromatic amino compound are: aniline, 1,2-, 1,3-, and 1,4-phenylenediamines, 2-, 3- and 4-aminophenols, 2-, 3- and 4-chloroanilines, 4-aminoazobenzene, 2,4-diaminoazobenzene, 4-aminoacetanilide, 2-, 3- and 4-methylanilines, 4-aminodiphenylamine, 2-aminodiphenylamine, 4,4'-diaminodiphenylamine, N,N-dimethyl-1,4-phenylenediamine, 4-amino-3'-methoxydiphenylamine, 4-amino-4'-hydroxydiphenylamine, 4-chloro-1,2-phenylenediamine, 4-methoxy-1,2-phenylenediamine, 2-amino-4-chlorophenol, 2,3-diaminotoluene and the like, among which particularly preferred are aniline, 1,2-, 1,3- and 1,4-phenylenediamines, 2-, 3- and 4-aminophenols, 4-aminodiphenylamine and 4,4'-diaminodiphenylamine.

The other reactant to be reacted with the above named aromatic amine compound is an aromatic nitro compound represented by the general formula:

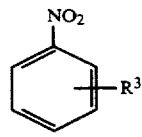

in which $R^3$ is a hydrogen atom, chlorine atom or a group selected from the class consisting of hydroxy, methoxy, ethoxy, amino, carboxyl —COOH and sulfo —$SO_2OH$ groups.

Exemplary of such an aromatic nitro compound are: nitrobenzene, 2-, 3- and 4-nitrophenols, 2-, 3- and 4-nitroanisoles, 2-, 3- and 4-nitrophenetoles, 2-, 3- and 4-chloronitrobenzenes, 2-, 3- and 4-nitroanilines, 2-, 3- and 4-nitrobenzoic acids, 2-, 3- and 4-nitrobenzenesulfonic acids and the like, among which particularly preferred are nitrobenzene, 2-, 3- and 4-nitrophenols, 2-, 3- and 4-nitrobenzoic acids and 2-, 3- and 4-nitrobenzenesulfonic acids.

The condensation reaction of the above named aromatic amine and nitro compounds is carried out in the presence of a mineral acid and a condensation catalyst.

Suitable mineral acids are hydrochloric acid, sulfuric acid, nitric acid, phosphoric acid and hydrobromic acid, of which the former two are preferred.

The condensation catalyst is preferably an oxidizing compound selected from the class consisting of permanganic acid, permanganates such as potassium permanganate, chromic acid and related compounds such as chromium trioxide, potassium bichromate and sodium chlorochromate, heavy metal nitrates such as silver nitrate and lead nitrate, halogens such as iodine, bromine and chlorine, inorganic and organic peroxides such as hydrogen peroxide, sodium peroxide, dibenzoyl peroxide, potassium persulfate, ammonium persulfate, peracetic acid, cumene hydroperoxide, perbenzoic acid and p-menthane hydroperoxide, oxyacids and salts thereof such as iodic acid, sodium and potassium iodates and sodium and potassium chlorates, metal salts such as iron(III) chloride, copper sulfate, copper(II) chloride and lead acetate, ozone and metal oxides such as copper oxide, mercury oxide, cerium oxide, manganese dioxide and osmic acid. Iron(II) chloride and copper(I) chloride may be used. It is sometimes advantageous that a small amount of iron(II) chloride is used in combination with hydrogen peroxide.

(2) According to U.S. Pat. No. 4,528,336, Condensation product I and XXI were prepared as described below.

A mixture composed of 1.00 mole of aniline, 0.227 mole of nitrobenzene, 0.310 mole of hydrochloric acid in the form of a 35% aqueous solution and 0.103 mole of iron(III) chloride was heated first at 60° C. for 6 hours followed by temperature elevation up to 180° C. to 185° C. where the mixture was kept with agitation for 15 hours with continuous distilling off of water. The aniline and nitrobenzene distilled out as accompanied by the water were returned to the reaction vessel during the reaction. Thereafter, the temperature of the reaction mixture was further increased to 200° C. and agitation was continued at this temperature for further 5 hours to complete the condensation reaction.

The thus formed reaction product in a molten state was poured into a large volume of a diluted hydrochloric acid and heated at 60° C. for 3 hours. The mixture was then filtered while it was still hot to remove the unreacted aniline in the form of the hydrochloride dissolved in the aqueous phase and the filtered cake was washed 5 to 6 times with water to remove the hydrochloric acid followed by drying to give the condensation product. The yield of this product was 45.2% of the total amount of the aniline and nitrobenzene. This product is called the Condensation product I hereinafter.

Condensation Products II to XX were prepared each in a similar manner to the preparation of the Condensation Product I with the formulation as indicated in Table 4 below for the aromatic amine compound, aromatic nitro compound, mineral acid and condensation catalyst as well as the amounts thereof. Table 4 also gives the yields of the respective condensation products calculated on the total amounts by weight of the aromatic amine and nitro compounds.

Further, Condensation Product XXI was prepared in a following manner. Thus, a mixture composed of 1.00 mole of aniline and 0.310 mole of 35% hydrochloric acid was chilled at 10° C. or below and, after admixing of 0.103 mole of iron(III) chloride, heated to a temperature of 60° C. where it was agitated for 6 hours to effect the condensation reaction of aniline alone. The temperature of this reaction mixture, without removing the unreacted aniline, was increased to 170° C. to distil out water and, while keeping the mixture at this temperature, 0.227 mole of nitrobenzene was added to the reaction mixture over a period of 6 hours followed by rapid temperature increase up to 180° C. to 185° C. where the reaction was continued for 15 hours. During this reaction period, water formed by the condensation reaction was distilled out together with small volumes of aniline and nitrobenzene and the aniline and nitrobenzene were separated from water and returned to the reaction vessel. Thereafter, the temperature of the reaction mixture was further increased to 200° C. and the reaction was completed by agitating the reaction mixture for additional 5 hours at this temperature.

The thus obtained reaction product in a molten state was poured into a large volume of a diluted hydrochloric acid and heated for 3 hours at 60° C. followed by filtration while the mixture was still hot to remove the unreacted aniline dissolved in the aqueous phase. The filtered cake was washed 6 times with water to remove the hydrochloric acid followed by drying to give the condensation product. The yield of this condensation product was 39.2% based on the total amount of the aniline and nitrobenzene initially used.

TABLE 4

| Condensation Product No. | Aromatic amine compound (moles) | Aromatic nitro compound (moles) | Mineral acid (moles) | Condensation catalyst (moles) | Yield % |
|---|---|---|---|---|---|
| I | Aniline (1.00) | Nitrobenzene (0.227) | Hydrochloric (0.310) | Iron(III) chloride (0.103) | 45.2 |
| II | 4-Methylaniline (1.000) | Nitrobenzene (0.262) | Hydrochloric (0.358) | Ammonium persulfate (0.118) | 40.5 |
| III | Aniline (0.349) + 1,4-phenylenediamine (0.370) | Nitrobenzene (0.407) | Hydrochloric (0.334) | Ammonium persulfate (0.088) | 53.1 |
| IV | 4-Methylaniline (0.630) + 4-aminodiphenylamine (0.370) | Nitrobenzene (0.330) | Hydrochloric (0.452) | Ammomium persulfate (0.089) | 45.0 |
| V | Aniline (0.664) + 4-aminodiphenylamine (0.336) | Nitrobenzene (0.402) | Hydrochloric (0.297) | Ammomium persulfate (0.098) | 55.3 |
| VI | Aniline (0.605) + 4-chloro-1,2-phenylenediamine (0.395) | 2-Nitrophenol (0.162) | Hydrochloric (0.270) | Ammomium persulfate (0.074) | 38.7 |
| VII | Aniline (0.540) + 2-aminophenol (0.460) | 4-Nitrophenol (0.217) | Hydrochloric (0.496) | Ammomium persulfate (0.044) | 60.2 |
| VIII | Aniline (0.500) + 3-aminophenol (0.500) | 4-Nitrophenetole (0.241) | Hydrochloric (0.496) | Hydrogen peroxide (0.296) + iron (II) chloride (0.004) | 57.1 |
| IX | Aniline (0.809) + 4-aminophenol | 2-Nitrophenol (0.116) | Sulfuric (0.498) | Hydrogen peroxide (0.443) + Iron(II) | 48.9 |

TABLE 4-continued

| Condensation Product No. | Aromatic amine compound (moles) | Aromatic nitro compound (moles) | Mineral acid (moles) | Condensation catalyst (moles) | Yield % |
|---|---|---|---|---|---|
| | (0.191) | | | chloride (0.006) | |
| X | Aniline (1.000) | 2-Amino-nitro-benzene (0.222) | Sulfuric (0.462) | 4-menthane hydroperoxide (0.162) | 45.0 |
| XI | Aniline (0.682) + 4-amino-4'-hydroxy-diphenlamine (0.318) | 3-Nitro-anisole (0.290) | Hydrochloric (0.296) | Sodium iodate (0.118) | 36.7 |
| XII | Aniline (0.607) + 2-amino-4-chlorophenol (0.393) | 2-Chloro-nitro-benzene (0.215) | Hydrochloric (0.263) | Sodium chlorate (0.239) | 40.5 |
| XIII | Aniline (0.578) + 4-chloro-aniline (0.422) | 4-Nitro-benzoic acid (0.148) | Hydrochloric (0.310) | Dibenzoyl peroxide (0.107) | 30.5 |
| XIV | Aniline (0.278) + 4-methyl-aniline (0.772) | 3-Nitro-phenol (0.335) | Hydrochloric (0.298) | Copper(II) chloride (0.126) | 42.0 |
| XV | 4-Amino-diphenyl-amine (0.370) + 1,3-phenylene-diamine (0.630) | 4-Nitro-benzene-sulfonic acid (0.243) | Hydrochloric (0.393) | Manganese dioxide (0.330) | 52.1 |
| XVI | 4-Amino-diphenyl-amine (0.400) + 1,2-phenylene-diamine (0.600) | 4-Amino-nitro-benzene (0.296) | Hydrochloric (0.393) | Iron(III) chloride (0.096) | 55.3 |
| XVII | Aniline (0.538) + 1,2-phenylene-diamine (0.462) | 4-Chloro-nitro-benzene (0.203) | Hydrochloric (0.286) | Ammonium persulfate (0.132) | 47.1 |
| XVIII | Aniline (1.000) | Nitro-benzene (0.227) | Hydrochloric (0.310) | Iron(II) chloride | 40.1 |
| XIX | Aniline (1.000) | Nitro-benzene (0.060) | Hydrochloric (0.310) | Iron (III) chloride (0.103) | 20.1 |
| XX | Aniline (1.000) | Nitro-benzene (0.755) | Hydrochloric (0.310) | Iron (III) chloride (0.103) | 40.1 |

We claim:

1. A method of preventing polymer scale deposition in a polymerization vessel in polymerization of a monomer having an ethylenic double bond comprising a haloethylene having the formula (I)

wherein X is a halogen atom, and R is a hydrogen atom or a halogen atom, wherein said polymerization is carried out in a polymerization vessel having a coating, on its inner wall surfaces, comprising:

(A) an aromatic compound having at least one group selected from the class consisting of primary, secondary and tertiary amino groups, an azo group and the quaternary ammonium group; or a dye having at least one group selected from said class, or a mixture thereof and (B) at least one compound selected from the group consisting of alkali metal salts and ammonium salts of a polyvinylsulfuric acid.

2. The method according to claim 1, wherein said coating further comprises (C) a naphthoquinone natural dye.

3. The method according to claim 2, wherein the coating has a coating weight of 0.001 to 5 g/m² in the dry state.

4. The method according to claim 1, wherein said coating has been also formed on parts of the polymerization vessel with which the monomer comes into contact during polymerization other than its inner wall surface.

5. The method according to claim 1, wherein said coating has been also formed on parts of the recovery system of an unreacted monomer with which unreacted monomer comes into contact.

6. The method according to claim 1, wherein the monomer comprises at least one member selected from the group consisting of vinyl halides and vinylidene halides, and optionally a monomer selected from the group consisting of vinyl esters; acrylic acid, methacrylic acid, and esters and salts thereof; diene monomers; aromatic vinyl compounds; and vinyl ethers.

7. The method according to claim 1, wherein said polymerization is carried out as suspension polymerization, emulsion polymerization, solution polymerization, bulk polymerization or gas phase polymerization.

8. The method according to claim 1, wherein said component (A) is selected from the group consisting of diaminodiphenylamine, diaminoaphthalenes, diaminoacridines, aminoazobenzenes, berberine hydrochloride, C.I.Solvent Black 3, 5, 7 and 22, C.I.Basic Black 2, C.I.Basic Orange 14, and the condensation products obtained by condensation of an aromatic amine compound having the formula:

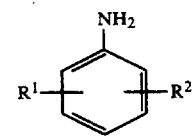

wherein R¹ is a hydrogen atom, chlorine atom, amino group, phenylamino group, or hydroxyphenylamino group and R² is a hydrogen atom, amino group, hydroxy group or methyl group, with an aromatic nitro compound having the formula:

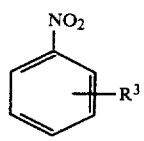

wherein $R^3$ is a hydrogen atom, chlorine atom, hydroxy group, methoxy group, ethoxy group, amino group or carboxyl group, in the presence of a condensation catalyst at a temperature of 100° C. and 250° C.

9. The method according to claim 8 wherein said aromatic amine compound is selected from the group consisting of aniline, phenylene diamine, diphenyl amine and amino phenol, or mixtures thereof; said aromatic nitro compound is selected from the group consisting of nitrobenzene, nitrophenol, nitroanisole and nitrobenzoic acid, or mixtures thereof.

10. The method according to claim 1, wherein said component (B) is contained in an amount of 1 to 100,000 parts by weight per 100 parts by weight of said component (A).

11. The method according to claim 1, wherein said coating further comprises a naphthoquinone natural dye (C) which is contained in an amount of 0.1 to 5,000 parts by weight per 100 parts by weight of the component (A).

12. The method according to claim 11, wherein the component (C) is selected from the group consisting of naphthopurpurin, alkannan, 2,3-dihydroxynaphthazarin, shikonin, and derivatives of shikonin.

13. The method according to claim 1, wherein said coating further comprises (D) a water-soluble polymer compound.

14. The method according to claim 13, wherein the water-soluble polymer compound (D) is selected from the group consisting of carboxymethyl cellulose, methyl cellulose, polyethyleneimine, polyvinyl alcohols, and gelatin.

15. The method of claim 1, wherein said coating has been formed by application of a liquid containing the components (A) and (B) dissolved or dispersed in at least one solvent selected from the group consisting of water, alcohols, ketones, ethers, esters, furans, aliphatic hydrocarbons, aromatic hydrocarbons, halogenated hydrocarbons and aprotic organic solvents.

16. The method of claim 15, wherein said liquid has a pH which is adjusted to 7 or less with a pH adjuster.

17. The method of claim 16, wherein the pH adjuster (E) is selected from the group consisting of phosphoric acid, perchloric acid, molybdic acid, tungstic acid, phosphomolybdic acid, phosphotungstic acid, molybdosilicic acid, tungstosilicic acid, p-toluenesulfonic acid, phytic acid and the acidic salts thereof.

* * * * *